United States Patent [19]

Thompson

[11] 4,408,194
[45] Oct. 4, 1983

[54] CAPACITIVE PRESSURE RELIEF RUPTURE DISC MONITOR

[75] Inventor: Leonard K. Thompson, Independence, Mo.

[73] Assignee: Continental Disc Corporation, Kansas City, Mo.

[21] Appl. No.: 230,662

[22] Filed: Feb. 2, 1981

[51] Int. Cl.³ ............................................. G08B 21/00
[52] U.S. Cl. ...................................... 340/626; 73/724; 137/68 R; 340/614
[58] Field of Search .............. 340/626, 590, 591, 614; 137/67, 68 R; 73/718, 724; 200/61.08; 361/283

[56] References Cited

U.S. PATENT DOCUMENTS

| | | | |
|---|---|---|---|
| 3,352,157 | 11/1967 | Seegmiller | 73/724 |
| 3,770,918 | 11/1973 | Fortmann | 137/68 R |
| 3,793,885 | 2/1974 | Frick | 73/718 |
| 3,993,939 | 11/1976 | Slavin | 73/724 |
| 4,232,698 | 11/1980 | Hosterman et al. | 73/724 |
| 4,263,929 | 4/1981 | Kearney | 340/626 |
| 4,272,959 | 6/1981 | Yomane | 340/626 |

OTHER PUBLICATIONS

Bulletin 304A, Robertshaw Controls Co., Oct. 1977.
Bulletin SW-2, Gordon Engineering Corp., Aug. 1978.
Bulletin FTC 1620, Endress and Hauser, Inc., Oct. 1978.
Bulletin, 4900 Series, Electro Corp., 1979.

Primary Examiner—Gerald L. Brigance
Attorney, Agent, or Firm—Litman, Day & McMahon

[57] ABSTRACT

A capacitive pressure relief rupture disc monitor for use in detecting the rupture of an electrically conductive rupture disc installed in a pressure relief vent includes a flat metal loop positioned in spaced relation to the rupture disc and forming a capacitor therewith. A capacitance sensor is connected to the disc and the loop and is operative to generate an output signal in response to a selected change in the capacitance between the loop and the disc as a result of movement of portions of the disc during rupture thereof. The output signal from the capacitance sensor is operative to trigger an alarm to thereby indicate the rupture of the disc.

13 Claims, 4 Drawing Figures

CAPACITIVE PRESSURE RELIEF RUPTURE DISC MONITOR

FIELD OF THE INVENTION

The present invention relates to a monitor for sensing the rupture of a pressure relief rupture disc and more particularly to such a monitor which detects a change in the capacitance between the disc and a sensing loop upon displacement of portions of the rupture disc upon rupture thereof and triggers an alarm in response thereto.

BACKGROUND OF THE INVENTION

Sensors have been provided on pressure relief rupture discs with connections to indicator lights and alarm systems at a monitor station to advise an operator of the rupture of such a disc so that corrective procedures may be directed most expeditiously to the required location. One type of sensor which has been employed is of the open probe type which operates by conduction of current between a petal or portion of the rupture disc and a metal probe when electrical contact therebetween occurs during the rupture of the disc. In a closed probe type of sensor, both conductors of the sensor are carried in the probe, and the disc during rupture contacts and deforms the probe to establish conduction which may be detected.

The requirement for actual contact between a portion of the disc and the probe necessitates precise placement of the probe to assure reliability and even with such placement the disc may not move sufficiently during rupture to engage the probe or may break apart or shatter such that parts of the disc do not engage the probe at all. The probes are generally not suited for more than one use, and the mounting for such probes requires precise forming. Further, arcing during the establishment of electrical contact between the required parts in a conductive sensor type system must be safely contained if the sensor is to be used in the presence of flammable or explosive substances.

SUMMARY AND OBJECTS OF THE INVENTION

A rupture disc monitor is provided which overcomes the limitations of the conductive probe type of sensor and other conductive sensors by sensing changes in the capacitive relationship between a disc and a sensor of the monitor.

The principal objects of the present invention are: to provide a capacitive monitor for detecting the rupture of a pressure relief rupture disc; to provide such a monitor which does not require mutual contact of the rupture disc with a sensor to issue an alarm; to provide such a monitor which monitors substantially the whole rupture disc such that the amount or manner of movement of parts of the disc upon rupturing is not critical to the sensing thereof; to provide such a monitor which precludes electrical arcing upon operation for safe use in the presence of flammable substances; to provide such a monitor which is not damaged upon rupture of the disc such that the sensor thereof is reusable thereafter; to provide such a monitor that can be easily retrofitted to existing rupture disc assemblies; to provide such a monitor which can be adapted for use with rupture discs of different operating principles; and to provide such a monitor which is economical to manufacture, positive in operation, durable in use, and which is particularly well adapted for the intended purpose thereof.

Other objects and advantages of this invention will become apparent from the following description taken in connection with the accompanying drawings wherein are set forth, by way of illustration and example, certain embodiments of the *Capacitive Pressure Relief Rupture Disc Monitor.*

The drawings constitute a part of the specification, include an exemplary embodiment of the present invention, and illustrate various objects and features thereof.

DETAILED DESCRIPTION OF THE PREFERRED EMBODIMENTS

Figure 1:
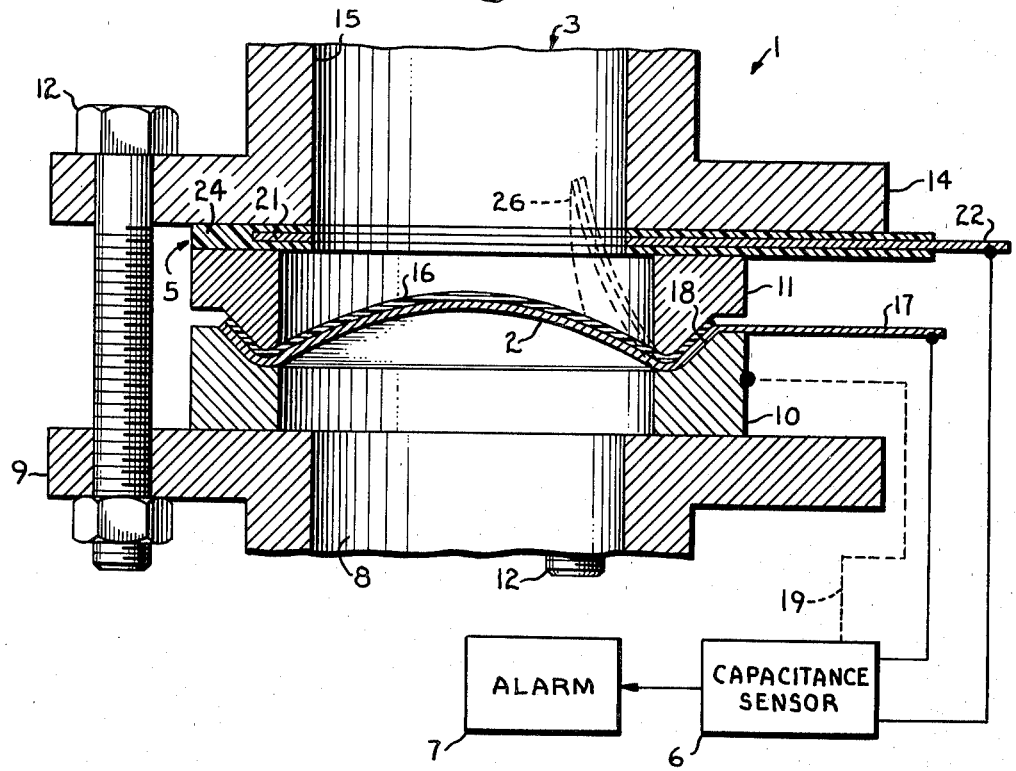
FIG. 1 is a sectional view of a pressure relief rupture disc assembly employing the capacitive disc monitor according to the present invention with circuit components illustrated schematically and with a portion of a rupture disc shown as displaced by rupture thereof in phantom.
Figure 2:
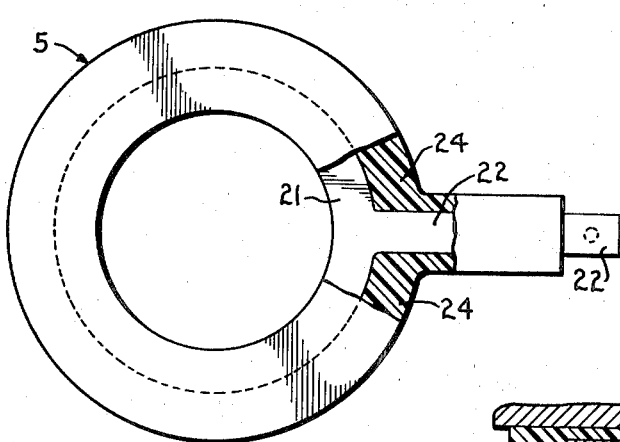
FIG. 2 is a plan view at a reduced scale of a capacitive sensor element assembly of the monitor.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail:

The reference numeral 1 generally designates a capacitive pressure relief rupture disc monitor for detecting the rupture of a rupture disc 2 installed in a pressure relief vent assembly 3. The disc monitor 1 generally comprises a capacitive plate, loop or sensor element 5 positioned in spaced relation to the disc 2, a capacitance sensor 6 connected to the sensor element 5 and the disc 2, and an alarm 7 connected to the capacitance sensor 6.

Figure 3:
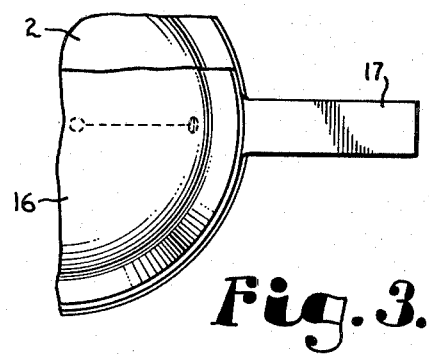
FIG. 3 is a fragmentary top plan view at reduced scale of the rupture disc.

Referring to FIG. 1, the pressure relief vent assembly 3 includes a vent pipe 8 terminating in a flange 9. The rupture disc 2 is positioned between a pair of cooperating mounting rings 10 and 11. The vent assembly 3 is clamped together by a plurality of circumferentially spaced bolts 12 passing through a flange 14 of an external relief pipe 15 and the flange 9 of the vent pipe 8. The disc 2 is made of a material having known relief characteristics at a selected thickness and may be scored, as shown in FIG. 3, such that the disc 2 ruptures in a controlled manner at a selected pressure differential on opposite sides thereof. The disc 2, constructed in the manner illustrated in FIGS. 1 and 3, is adapted to rupture to prevent overpressure in the vent pipe 8 on the lower side of the disc 2.

The illustrated disc 2 is formed of an electrically conductive material, such as a suitable metal, for use with the present invention. The disc 2, illustrated in FIGS. 1 and 3, includes a dielectric integral coating 16 of easily ruptured plastic or the like. The disc 2 may include a connector tab 17 to provide for electrical connection to the capacitance sensor 6. Alternatively, the disc 2 may be in electrical contact with a contact portion 18 of the vent assembly 3, such as a surface of the lower mounting ring 10. In such a case, connection of the capacitance sensor 6 to the disc 2 may be made by electrical connection to the ring 10, as is illustrated in phantom in FIG. 1 by the conductor 19.

In order to detect movement of portions of the disc 2 during rupture thereof, the capacitive sensor element 5 is positioned in closely spaced relationship to the disc 2 to form an electrical capacitor therewith. The sensor element 5 in the illustrated embodiment is formed of a flat loop 21 of metal, although it is foreseen that capacitor plates of other materials of construction and shapes could be used for the sensor element. A connector tab 22 extends outwardly from the loop 21 and provides for connection thereof to the capacitance sensor 6. At locations where the sensor element 5 contacts portions of the vent assembly 3, the sensor element 5 is insulated therefrom by a dielectric covering 24. The dielectric covering 24 must be generally dimensionally stable and impervious to chemicals and moisture in order to prevent undesired changes in capacitance and possible false alarms over the period of time in which the disc 2 is in non-ruptured service. The preferred materials for the dielectric covering 24 includes glass-mica mixtures or fiberglass cloth impregnated with tetrafluoroethylene such as is marketed under the trademark Teflon.

The exact manner of installation of the sensor element 5 depends upon the type of disc assembly involved and whether the vent assembly is for pressure or vacuum relief. The rupture disc monitor 1 has utility with both pressure and vacuum vent assemblies and with rupture discs of the direct type, as illustrated in FIG. 1, and with other types of discs such as the reverse buckling type or the like. By proper design of the capacitance sensor 6 and placement of the sensor element 5 relative to the disc 2, either increases or decreases in the capacitance between the sensor element 6 and the disc 2 can be detected.

As shown in FIG. 1, the sensor element 5 is interposed between the upper mounting ring 11 and the flange 14 of the external vent pipe 15. Upon rupture of the disc 2, petals or fragments 26 thereof, as shown in phantom in FIG. 1, are displaced in the direction toward the sensor element 5 whereby the capacitance therebetween increases. It is conceivable that a fragment 26 of the disc could be torn free and blown out the external relief pipe 15 or a fragment thereof displaced into the vent pipe 8 by an unexpected vacuum; however, such an occurrence would still result in a change in the capacitance, which can be detected by the sensor 6.

The capacitance sensor 6 may be any type of circuit which is able to sense a change in capacitance of the proper range and which generates an output signal in response to a selected capacitance change. Since the capacitance of a system is proportional to the quantity of charge held by the system and the voltage across the system, a change in capacitance results in either a change in the charge quantity, a charging or discharging current, or a change in the voltage. Conventional circuits may be adapted for sensing and amplifying the change in charge or voltage to provide the output signal for the alarm 7. Alternatively, there are currently available a number of types of capacitively actuated proximity switches which may be employed. For example, proximity switch model PC 131 from the Gordon Engineering Corporation; or other similar types of devices. Some proximity switches, such as the Gordon PC 131 are so constructed that they must be installed directly on the sensing element. Therefore, suitable provisions would have to be made on the connecting tab 22 of the sensor element 5 for such a type of capacitance sensor.

The alarm 7 may be any type of device which is compatible with the capacitance sensor and which will notify an operator of the rupture of a disc 2. In a chemical manufacturing plant, there are likely to be a plurality of rupture discs 2 protecting the pressure vessels thereof. The main purpose of providing monitors 1 to detect the rupture of the discs 2 is so that the location of a ruptured disc 2 can be quickly pinpointed. Therefore, a practical alarm 7 might consist of a conventional alarm panel (not shown) with indicator lights corresponding to each disc 2 and with a single audible alarm which would be activated upon the illumination of any one of the indicator lights. Other types of alarms suitable for this invention would occur to one skilled in this art. The alarm 7 preferably locks on such that later modification of the rupture disc 2 to a non-rupture position after rupture will continue to signal or indicate the need for replacing the disc 2.

When the sensor element 5 opens into the interior of the channel formed by the pipes 8 and 15, the disc coating 16 can be beneficially utilized to prevent the conductive portion of the disc 2 from engaging the sensor element 5 and potentially producing a spark in an atmosphere wherein sparking is undesired due to explosive nature of material in the pipe 8 or the like.

Figure 4:
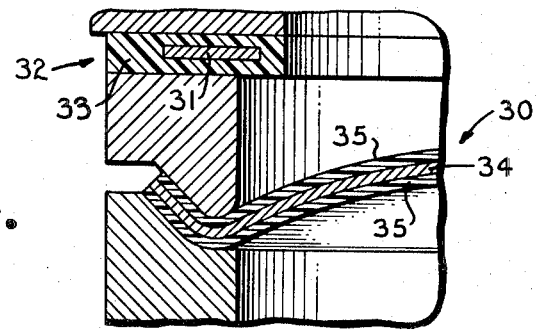
FIG. 4 is a fragmentary sectional view of a modified capacitive sensor element assembly.

FIG. 4 illustrates a rupture disc assembly 30 employing an alternative embodiment of the sensor element, including a flat loop 31 of the sensor element 32 which is completely enclosed within a dielectric covering 33. Further, a rupture disc 34 is also completely enclosed in or sandwiched between a dielectric covering 35. It is often desirable to completely enclose the loop 31 and the disc 34 in respective dielectric coverings to provide assurance against contact and possible arcing therebetween, if the disc 34 is used in a flammable or explosive atmosphere. Further, it might be desirable to protect the flat loop 31 in this way from the effects of corrosive substances to lengthen the useful life of the sensor element 32. The operation of the monitor of the present invention with either or both of the loop 31 and disc 34 is the same as described for the embodiment illustrated in FIG. 1.

Although the above described embodiments utilize an electrically conductive rupture disc as a capacitor plate, it is foreseen that both conductive capicator surfaces or plates could be separate from the disc with the disc located near or between such plates. The disc may then be conductive or not and modification thereof by rupture would change the capacitance between the plates so as to sound the alarm. It is also foreseen that movement of a fluid through the channel betwen the plates would modify the capacitance (even when the fluid is a dielectric as long as the fluid has a different dielectric coefficient from the substance in the channel above the rupture disc). Therefore, numerous types and combinations of capacitor plates are foreseen according to the present invention.

While certain forms of the present invention have been described and illustrated, it is not to be limited thereto except insofar as such limitations are included in the following claims.

What is claimed and desired to be secured by Letters Patent is:

1. In combination:
   (a) a pressure relief rupture disc mounted in a pressure relief vent, said disc being electrically conductive and operative to rupture at a selected pressure differential within said vent on one side of said disc;
   (b) capacitor means positioned in spaced relation to said rupture disc and forming an electrical capacitor therewith, said capacitor plate means being a loop of electrically conductive material, surrounding the interior of the vent and disposed to allow flow through said loop upon rupture of said disc, the capacitance between said rupture disc and said capacitor plate means varying in proportion to changes in the position of portions of said disc;
   (c) capacitance sensor means connected to said rupture disc and said capacitor plate means and operative to sense changes in a capacitance between said rupture disc and said capacitor plate means; said sensor means providing an output signal upon a selected change in said capacitance; and
   (d) alarm means connected to said capacitance sensor means and operative to trigger an indicator in response to said output signal to thereby indicate the rupture of said disc.

2. The combination as set forth in claim 1 wherein:
   (a) said rupture disc is in electrical contact with a contact portion of said pressure relief vent; and
   (b) said capacitance sensor means is connected to said disc by electrical connection to said contact portion of said pressure relief vent.

3. The combination as set forth in claim 1 wherein said capacitor plate means comprises:
   (a) said loop being a flat loop;
   (b) a connector tab extending from said loop and providing for electrical connection to said loop; and
   (c) a dielectric covering positioned in surrounding relation to said loop and said tab and insulating same from said disc.

4. The combination as set forth in claim 3 wherein said loop is completely enclosed by said dielectric covering.

5. The combination as set forth in claim 3 wherein said rupture disc is completely insulated from said pressure relief vent.

6. A capacitive sensor element for positioning in spaced relation with an electrically conductive pressure relief rupture disc to form an electrical capacitor therewith, the capacitance of said capacitor changing in response to changes of position of portions of said disc during rupture thereof, the change in capacitance being detectable to indicate the rupture of said disc in a pressure relief vent, said sensor element comprising:
   (a) a relatively flat loop of electrically conductive material adapted for placing in surrounding relationship about the relief vent; said loop having an aperture therethrough for allowing fluid in the vent to pass therethrough after rupture of said disc;
   (b) a connector tab extending from said loop and providing for electrical connection to said loop; and
   (c) a dielectric covering positioned in surrounding relation to said loop and said tab to insulate same from portions of the pressure relief vent in which said sensor element is to be installed.

7. A capacitive sensor element as set forth in claim 6 wherein said loop except for said tab is completely enclosed by said dielectric covering.

8. The capacitive sensor element as set forth in claim 6 in combination with:
   (a) a pressure relief rupture disc mounted in a pressure relief vent, said disc being electrically conductive and operative to rupture at a selected pressure differential on opposite sides thereof within said vent to prevent overpressure;
   (b) said sensor element being positioned in spaced relation with said rupture disc and forming an electrical capacitor therewith;
   (c) capacitance sensor means connected to said rupture disc and said sensor element and operative to sense changes in the capacitance between said rupture disc and said sensor element and providing an output signal upon a selected change in said capacitance; and
   (d) alarm means connected to said capacitance sensor means and operative to trigger an indicator in response to said output signal to thereby indicate the rupture of said disc.

9. The capacitive sensor element as set forth in claim 8 wherein:
   (a) said rupture disc is in electrical contact with a contact portion of said pressure relief vent; and
   (b) said capacitance sensor means is connected to said disc by electrical connection to said contact portion of said pressure relief vent.

10. The capacitive sensor element as set forth in claim 8 wherein:
    (a) said rupture disc is completely insulated from said pressure relief vent.

11. In a pressure relief vent assembly including a rupture disc and adapted for relieving pressure through a vent whenever a preselected differential pressure on opposite sides of the rupture disc is exceeded; the improvement comprising: a monitor for sensing rupture of the disc; said monitor including:
    (a) capacitor means associated with said rupture disc; said capacitor means being in closely spaced relationship with said disc such that a deformation of said disc produces a change in capacitance of said capacitor means, said capacitor means including at least one capacitor plate which is a loop of electrically conductive material; said loop surrounding the interior of the vent and disposed to allow flow through said vent upon rupture of said disc;
    (b) sensor means communicating with said capacitor means and operative to sense changes in said capacitance; said sensor means providing an output signal upon a pre-selected differential change in said capacitance; and
    (c) alarm means communicating with said sensor means and operative to trigger an indicator in response to said output signal to indicate rupture of said disc.

12. The assembly according to claim 11 wherein:
    (a) said disc comprises one capacitor plate of said capacitor means.

13. The assembly according to claim 11 wherein:
    (a) said capacitor means includes a pair of capacitor plates mounted in spaced relation about said vent, each plate being a loop of said electrically conductive material, said plates being conductively connected to said sensor means; and
    (b) said disc is positioned between said plates and is not conductively connected thereto.

* * * * *